May 26, 1970 D. L. FETT 3,514,640

MEMORY FLIP-FLOP

Filed Feb. 3, 1967 2 Sheets-Sheet 1

INVENTOR.
DARRELL L. FETT

United States Patent Office 3,514,640
Patented May 26, 1970

3,514,640

MEMORY FLIP-FLOP

Darrell L. Fett, Phoenix, Ariz., assignor to General Electric Company, a corporation of New York Filed Feb. 3, 1967, Ser. No. 613,944
Int. Cl. H03k *3/12*
U.S. Cl. 307—289 9 Claims

ABSTRACT OF THE DISCLOSURE

A pair of current-mode NOR/OR-gates and a pair of current-mode NOR-gates provide a flip-flop having a plurality of output terminals which are isolated from each other. The current-mode operation of these gates allows small values of input signals to set or reset the flip-flop when a predetermined combination of signals is applied to a plurality of input terminals. A single signal applied to a reset input terminal resets the flip-flop regardless of the signals which may be applied to the other input terminals.

BACKGROUND OF THE INVENTION

This invention relates to bistable devices and more particularly to high speed flip-flops which are especially useful as memory elements in an electronic data processing system.

A prior art flip-flop is a bistable circuit which operates in either one of two stable states and has two signal input terminals, each of which corresponds with one of the two states. The flip-flop remains operating in either state until transferred to the other state by application of a trigger signal to the corresponding terminal. In one state of operation the flip-flop represents the binary 1 (1-state) and in the other state the binary 0 (0-state).

An imporant application of the flip-flop is its use as a memory or data storage device in electronic data processing systems. Buffer memories provide temporary storage for data words being transferred to a main memory from a peripheral device, such as a magnetic tape handler. Flip-flops are especially useful in buffer memories where it is desired that data words be "written" into the buffer and "read" out of the buffer memory in a very short period of time. Each flip-flop stores an element of information representing a binary digit, the binary digit being termed a "bit." A data word is composed of several bits. Each bit is either a binary 0 or a binary 1.

It is desirable, in electronic data processing systems that data be written into the buffer memory and read out of the buffer memory only during the time of a synchronizing pulse. Thus, buffer memories employing prior art flip-flops require, in addition, a pair of input coincidence gates and a pair of output coincidence gates, for each flip-flop. The coincidence gates used in prior art circuits prevent a bit from being written into the flip-flop, or read out of the flip-flop until a synchronizing pulse is applied to one of these coincidence gates. Prior art gates and prior art flip-flops employ transistors in circuits which require relatively large values of input signals in order to provide logic signals which are not seriously affected by noise in the data processing system. Semiconductor materials used in these transistors store electrical charges during the time an input signal causes the transistor to be in a conductive condition. These charges must be supplied to the transistor in order to render the transistor conductive and these charges must be removed to render a transistor nonconductive after it has been conductive. The amount of these charges and the time required to supply and remove these charges is dependent upon the value of the input signals. The relatively large values of input signals used in prior art gates and prior art flip-flops cause relatively large amounts of charge to be stored in these transistors and cause these circuits to be relatively slow. The large values of input signals used and the relatively large amounts of charge stored in the transistor also cause relatively large amounts of power to be dissipated in the transistors used in the prior art gates and flip-flops.

The present invention alleviates the disadvantages of the prior art by using a plurality of transistors in a current-mode circuit which requires input signals which are less than 25% of the value of input signals required in prior art gates and flip-flops. This reduces the power dissipation in the gates and flip-flops and increases the speed of operation of these circuits.

The current-mode circuit has a plurality of signal input terminals so that a plurality of input signals may be applied to the flip-flop without the use of additional gates which are required in prior art circuits.

Prior art flip-flops have output terminals which are connected to the transistors that form the bistable circuit. When loads which require relatively large amounts of current are connected to these output terminals the speed of operation of the flip-flop is decreased and larger values of input signals are required to trigger the flip-flop.

The present invention alleviates these disadvantages of the prior art flip-flops by using a current-mode circuit having output terminals which are isolated from the transistors that form the bistable circuit.

In some electronic data processing systems it is important that a flip-flop be set or reset only when a predetermined combination of signals is applied to the input terminals. It is also important that the flip-flop be reset by a signal applied to a high-priority input terminal regardless of any other signals which may be applied to the input terminals.

The present invention has means for setting the flip-flop when a first predetermined combination of signals is applied to the input terminals and has means for resetting the flip-flop when a second predetermined combination is applied to the input terminals. The present invention also has means for resetting the flip-flop when a signal is applied to a predetermined or "reset" input terminal regardless of any signals which are applied to other input terminals.

It is therefore an object of this invention to provide a new and improved flip-flop.

Another object of this invention is to provide a flip-flop which can be set or reset with a small value of input signal.

A further object of this invention is to provide a flip-flop having a plurality of input terminals.

A still further object of this invention is to provide a flip-flop which can be set or reset when a predetermined combination of signals is applied to the input terminals.

Still another object of this invention is to provide a flip-flop which can be reset when a signal is applied to a predetermined input terminal regardless of the signals which are applied to the other input terminals.

Another object of this invention is to provide a flip-flop having a plurality of output terminals which are isolated from each other.

A further object of this invention is to provide a flip-flop having output terminals which are isolated from the transistors that form a bistable circuit.

A still further object of this invention is to provide a flip-flop using current-mode gates.

SUMMARY OF THE INVENTION

The foregoing objects are achieved in the instant invention by providing a new and improved flip-flop which employs a pair of current-mode NOR/OR-gates and a pair of current-mode NOR-gates. The NOR/OR-gates have a plurality of signal input terminals and have output terminals which are isolated from transistors which form the bistable circuit. These current-mode gates require relatively small values of input signals to set or reset the flip-flop.

Other objects and advantages of this invention will become apparent from the following description when taken in connection with the accompanying drawings.

BRIEF DESCRIPTION OF THE DRAWINGS

FIG. 1 includes a pair of current-mode NOR/OR-gates 11 and 12 which are cross-coupled to form a bistable multivibrator. Each of these NOR/OR-gates includes first, second and third signal input terminals and first and second output terminals. The signal input terminals 14, 15 and 16 are connected to the bases of input transistors 18, 19 and 20 respectively of NOR/OR-gate 11. The collectors of these input transistors are coupled through a resistor 22 to a positive potential such as a positive 1.1 volts. The emitters of the input transistors 18, 19 and 20 are coupled through a second resistor 23 to a negative potential such as a negative 3 volts. The NOR/OR-gate 11 also comprises an output transistor 25 having its emitter connected to the emitters of the input transistors 18, 19 and 20. The collector of output transistor 25 is coupled through a resistor 26 to a positive potential such as a positive 1.1 volts. The base of output transistor 25 is connected to a third potential such as ground. An OR or "true" output signal is obtained from a first or "true" output terminal 28 and a NOR or "complementary" output signal is obtained from the second or "complementary" output terminal 29.

Figures 1, 2:
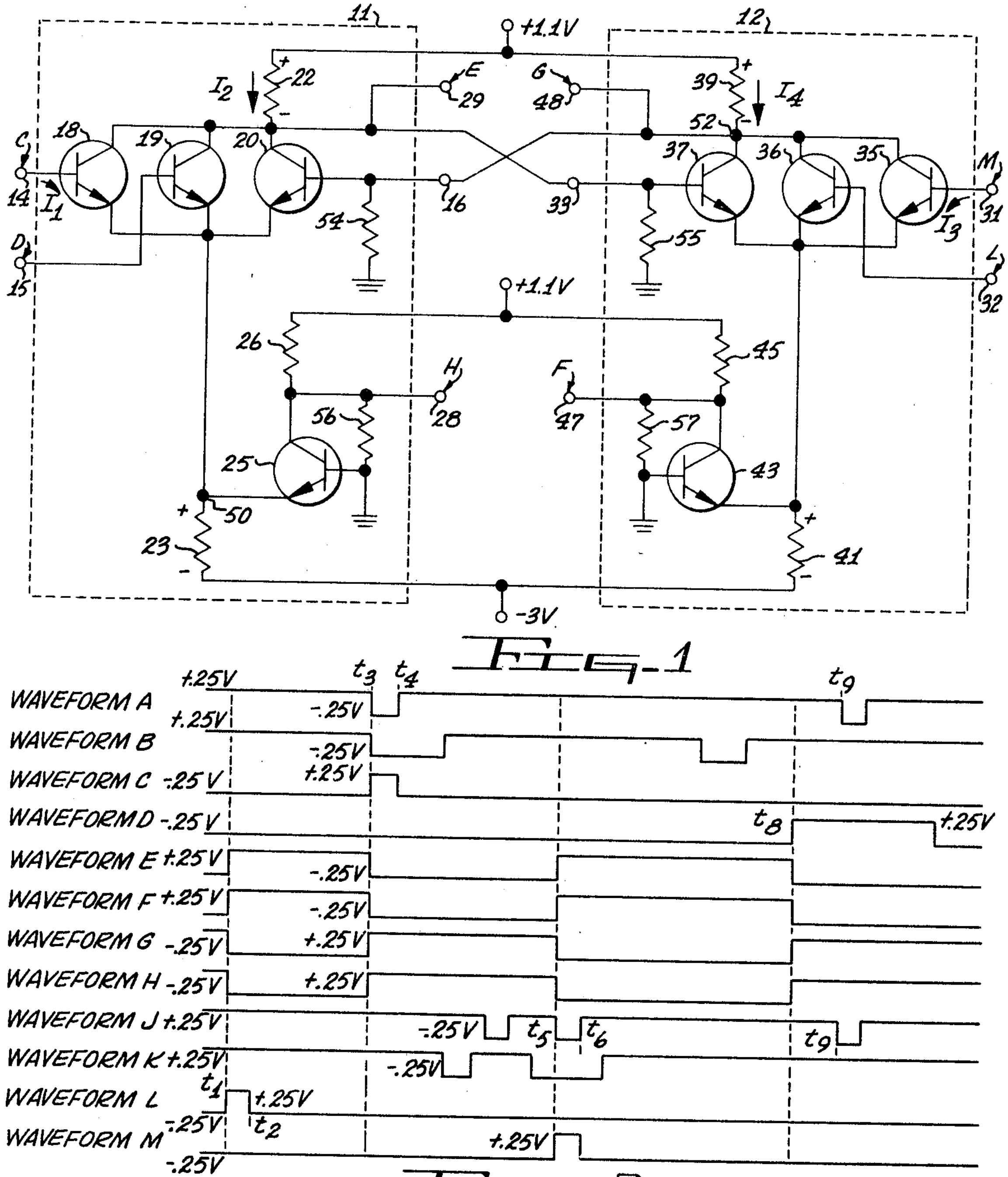
FIG. 1 is a schematic diagram of one embodiment of the instant invention.
FIG. 2 illustrates waveforms which are useful in explaining the operation of the circuits shown in FIGS. 1, 3 and 4.

A NOR/OR-gate develops both NOR logic signals and OR logic signals. The NOR/OR-gate provides the NOR logic operation and the logical operation of inclusive OR for positive signals applied thereto. The NOR/OR-gate provides a first output signal representing a binary 1 to a NOR output terminal when none of the input signals applied to the gate represent binary 1's. When one or more of the input signals represent binary 1's, the signal at the NOR output terminal represents a binary 0. The NOR/OR-gate provides a second output signal representing a binary 1 to an OR output terminal when any one or more of the input signals applied to the gate represent binary 1's. When none of the input signals represent binary 1's, the signal at the OR output terminal represents a binary 0.

The NOR/OR-gate 12 has first, second and third signal input terminals 31, 32 and 33 which are connected to the bases of input transistors 35, 36 and 37 respectively. The collectors of input transistors 35, 36 and 37 are coupled through a resistor 39 to a positive potential such as a positive 1.1 volts. The emitters of input transistors 35, 36 and 37 are coupled through a resistor 41 to a negative potential such as a negative 3 volts. An output transistor 43 has its emitter connected to the emitters of input transistors 35, 36 and 37. A resistor 45 couples the collector of output transistor 43 to a positive potential such as a positive 1.1 volts. The base of output transistor 45 is connected to a third reference potential such as ground.

The values of the resistors used in the circuit of FIG. 1 are not critical; however, the ratio of the values of resistors 22 and 23 is critical and the ratio of the values of resistors 39 and 41 is critical. These ratios should not vary more than ±5% if small values of input signals are to be used. Typical values of resistors 22 and 39 are 215 ohms and typical values of resistors 23 and 41 are 243 ohms. When these values of resistors are used with the reference potentials, shown in FIG. 1, transistors 18, 19, 20, 35, 36 and 37 are each biased near cutoff so that input signals having values of ±1 volt will cause the input transistors in FIG. 1 to change from a conductive condition to a nonconductive condition. When input transistors 18, 19 and 20 are all in a nonconductive condition, the negative 3 volts applied through resistor 23 to the emitter of transistor 25 causes transistor 25 to be rendered conductive. When any of the input transistors 18, 19 and 20 are conductive, current through these input transistors and through resistor 23 provides a voltage across resistor 23 which renders output transistor 25 nonconductive. In a similar manner output transistor 43 is rendered conductive when input transistors 35, 36 and 37 are all nonconductive. When any of the input transistors 35, 36 and 37 are conductive, current through these input transistors and through resistor 41 provides a voltage across resistor 41 which renders output transistor 43 nonconductive.

To set the flip-flop in the 1-state a positive signal representing a binary 1 is applied to either terminal 14 or 15. This positive signal causes a corresponding one of the input transistors 18 or 19 to be rendered conductive. For example, when a +.25 volt as shown in waveform C of FIG. 2 is applied to input terminal 14, a current $I_1$ flows from terminal 14 through base to emitter of transistor 18, and through resistor 23 to the negative 3 volt potential. Current $I_1$ renders transistor 18 conductive so that a current $I_2$ flows from the positive 1.1 volt potential through resistor 22, through collector to the emitter of the input transistor 18 and resistor 23 to the negative 3 volt potential. The current through resistor 23 provides a voltage drop of approximately 2.475 volts across resistor 23 so that the voltage at junction point 50 is approximately −.575 volt. The voltage drop between the collector and the emitter of transistor 18 is approximately +3.25 volts so that the output voltage at output terminal 29 is −.25 volt as shown in waveform E of FIG. 2.

The −.575 volt at junction point 50 and at the emitter of output transistor 25 provides a +.575 volt between the base and the emitter of transistor 18. A typical transistor requires approximately +.6 volt between the base and the emitter to cause the transistor to start conducting. The +.575 volt between base and emitter of output transistor 25 is less than the voltage required to render transistor 25 conductive so that transistor 25 remains nonconductive while any of the input transistors are conductive. When output transistor 25 is nonconductive, no current flows through transistor 25 and a positive voltage representing a binary 1 is developed at the true output terminal 28. Thus, output transistors 25 and 43 are rendered conductive or nonconductive by the current through the corresponding input transistors. Any load connected to output terminals 28 and 47 does not affect the operation of the input transistors and does not affect the value of the input signals required to render the input transistors conductive or nonconductive.

When any of the input transistors 18 and 19 are conductive, the −.25 volt at the collectors of these input transistors is coupled to the input terminal 33 of the NOR/OR-gate 12. This negative voltage at the terminal 33 and at the base of the transistor 37 renders transistor 37 nonconductive. For example, at time $t_3$ of waveforms C and F (FIG. 2) transistor 37 is nonconductive and no current flows through resistor 39 so that a positive voltage is present at the collector of transistor 37 and at the input terminal 16 of the NOR/OR-gate 11. The positive voltage at input terminal 16 and at the base of transistor 20 renders transistor 20 conductive and sets the flip-flop in the 1 state.

The flip-flop shown in FIG. 1 may be reset to the 0 state by applying a positive voltage to either input terminal 31 or input terminal 32. For example, when a +.25 volt as shown at time $t_5$ in waveform M of FIG. 2 is applied to signal input terminal 31, a current $I_3$ flows from terminal 31 through base to emitter of transistor 35, and through resistor 41 to the negative 3 volt potential. Current $I_3$ renders transistor 35 conductive so that current $I_4$ flows from the positive 1.1 volt potential through resistor 39, through collector to emitter of the input transistor 35 and resistor 41 to the negative 3 volt potential. The current through resistor 39 provides a voltage drop across resistor 39 so the voltage at the junction point 52 is a —.25 volt as shown in waveform G of FIG. 2. The —.25 volt at junction point 52 is coupled to the base of input transistor 20 of NOR/OR-gate 11 so that transistor 20 is rendered nonconductive. When transistor 20 is rendered nonconductive, the voltage at the collector of transistor 20 becomes a positive voltage which is coupled to the base of input transistor 37 in NOR/OR-gate 12 thereby rendering transistor 37 conductive. Transistor 37 remains conductive and transistor 20 remains nonconductive so that the flip-flop remains in the 0 state until another positive input signal is applied to either signal input terminal 14 or signal input terminal 15.

Figure 3:
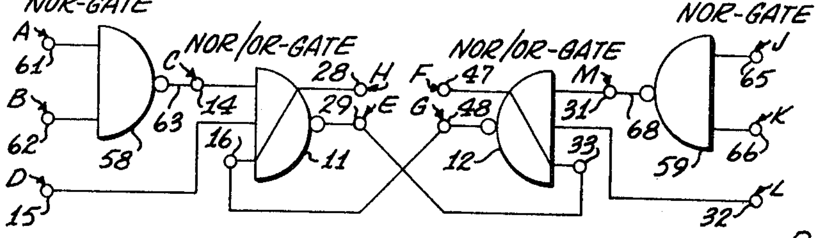
FIG. 3 is a diagram of another embodiment of the instant invention.

The block diagram of FIG. 3 shows the NOR/OR-gates 11 and 12 which were shown in FIG. 1 and a pair of NOR-gates 58 and 59 which have been added to provide a means for using the combination of input signals and synchronizing pulses to set and reset the flip-flop. NOR-gate 58 has a pair of signal input leads 61 and 62 and an output lead 63 which is connected to the input terminal 14 of the NOR/OR-gate 11. NOR-gate 59 has a pair of signal input leads 65 and 66 and an output lead 68 which is connected to the signal input terminal 31 of the NOR/OR-gate 12. A NOR-gate provides the NOR logical operation for positive signals applied thereto. A NOR-gate provides an output signal representing a binary 1, when none of the input signals applied thereto represent binary 1's. When one or more of the input signals represent binary 1's, the output signal represents a binary 0.

A positive voltage representing a binary 1 applied to input terminal 14 or input terminal 15 causes the flip-flop in FIG. 3 to be set as described above. A positive voltage applied to either input terminal 31 or input terminal 32 causes the flip-flop to be reset. Thus, the positive voltage shown in time $t_1$ of waveform L (FIG. 2) applied to input terminal 32 resets the flip-flop.

Clock pulses which are employed to synchronize the writing of data into the flip-flop are applied to input leads 61 of NOR-gate 58 and input lead 65 of NOR-gate 59. In some data processing systems the same clock pulses would be applied to both input leads 61 and 65, while in other systems a different set of clock pulses would be applied to input leads 61 and 65. The clock pulses which are applied to input lead 61 are shown in waveform A of FIG. 2, while the clock pulses applied to input lead 65 are shown in waveform J of FIG. 2.

At time $t_3$ the —.25 volt clock pulse applied to input lead 61 and the —.25 volt signal applied to input lead 62 cause NOR-gate 58 to develop a positive voltage representing a binary 1. This binary 1 is applied to input terminal 14 of NOR/OR-gate 11 causing the flip-flop to be set so that the output voltage at the true output terminals 28 and 45 is a positive voltage representing a binary 1. Also at time $t_3$, the output voltage at the complementary terminals 29 and 47 has a negative value representing a binary 0 as shown in waveforms E and F of FIG. 2.

At time $t_5$ the —.25 volt at input lead 65 and the —.25 volt at input lead 66 cause NOR-gate 59 to develop a positive voltage representing a binary 1. This binary 1 is applied to input terminal 31 of NOR/OR-gate 12 causing the flip-flop to be reset.

At time $t_8$ a positive voltage applied to the input terminal 15 causes the flip-flop to be set even though the signals on leads 61 and 62 of NOR-gate 58 do not cause NOR-gate 58 to provide a signal which will set the flip-flop. The flip-flop shown in FIG. 3 may be reset by another high priority signal applied to terminal 32 even though signals on the input leads 65 and 66 of NOR-gate 59 do not provide signals which would cause the flip-flop to be reset.

Figure 4:
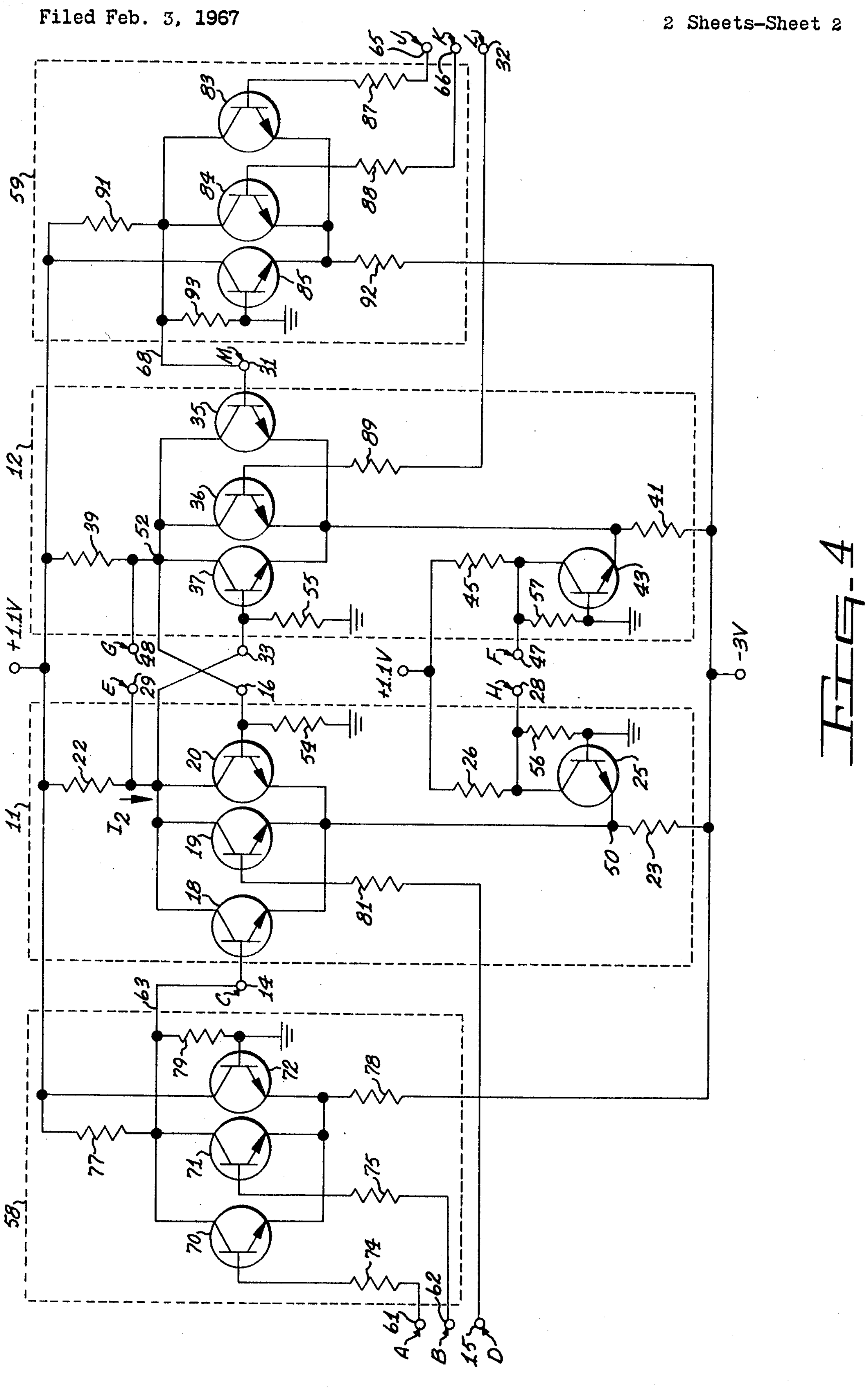
FIG. 4 is a schematic diagram of still another embodiment of the instant invention.

FIG. 4 illustrates a circuit embodiment of the invention of FIG. 3. The NOR-gate circuit 58 shown in FIG. 4 includes only a pair of input transistors 70 and 71 and an output transistor 72 but it should be understood that any reasonable number of input transistors may be provided. The collector of each of the other input transistors would be connected to the collectors of transistors 70 and 71 and the emitters of each of the other input transistors would be connected to the emitters 70 and 71. Positive signal voltages representing binary 1's and negative signal voltages representing binary 0's may be received at each of the input leads 61 and 62. These input signals are coupled through resistors 74 and 75 to the bases of input transistors 70 and 71 respectively. The bases of the other input transistors may be connected by a suitable resistor to a separate input lead and input signals may be received at each of these input leads. The resistors between the signal input leads and the bases of the input transistors prevent oscillations when a number of logic gates are connected together in a data processing system. The collectors of the input transistors are connected by a resistor 77 to a positive potential such as a positive 1.1 volts. The collector of the output transistor 72 is connected to the positive 1.1 volts. The emitters of the input transistors and the output transistors are coupled through a resistor 78 to a negative potential such as a negative 3 volts. The output lead 63 of the NOR-gate 58 is connected to the input terminal 14 of the NOR/OR-gate 11.

The value of the resistors used in the circuit is not critical; however, the ratio of the values of resistors 77 and 78 is critical and the ratio of the values of the resistors 77 and 79 is critical. These ratios should not vary more than ±5% if small values of input signals are to be used. Typical values of resistors 77, 78 and 79 are 215 ohms, 243 ohms and 75 ohms respectively. When these values of resistors are used with the reference potentials shown in FIG. 4, transistors 70, 71 and 72 are biased near cutoff so that input signals having values of ±.1 volt will cause the input transistors 70 and 71 to change from a conductive condition to a nonconductive condition. When any of these input transistors are conductive, current through the input transistors and through resistor 78 provides a voltage across resistor 78 which renders output transistor 72 nonconductive. When a positive signal representing a binary 1 is applied at either input lead 61 or 62, a corresponding one of the input transistors 70 or 71 is rendered conductive so that a negative voltage is developed at the output lead 63 of NOR-gate 58. When a negative voltage representing a binary 0 is applied at both input leads 61 and 62, transistors 70 and 71 are nonconductive so that a positive voltage is developed at the output lead 63 of the NOR-gate 58.

NOR-gate 59 includes a pair of input transistors 83 and 84 and an output transistor 85. The collectors of input transistors 83 and 84 are connected by a resistor 91 to a positive potential such as a positive 1.1 volts. The collector of output transistor 85 is connected directly to the positive 1.1 volts. The emitters of the transmitters 83, 84 and 85 are coupled through a resistor 92 to a negative potential such as a negative 3 volts. The output lead 68 is connected to the input terminal 31 of the NOR/OR-gate 12. Typical values of the resistors in NOR-gate 59 are similar to the values of the corresponding resistors used in NOR-gate 58. When these values of resistors are used with the reference potentials shown in FIG. 4, transistors 83, 84 and 85 are biased near cutoff so that input signals having values of ±.1 volt will cause input transistors 83 and 84 to change from a conductive condition to a nonconductive condition. When any of these input transistors are conductive, current through the input transistors and through resistor 92 provides a voltage across resistor 92 which renders output transistor 85 nonconductive. When a positive signal representing a binary 1 is applied at either input lead 65 or 66, a corresponding one of the input transistors 83 or 84 is rendered conductive so that a negative voltage is developed at output lead 68 of NOR-gate 59. When a negative voltage representing a binary 0 is applied at both input leads 65 and 66, transistors 83 and 84 are nonconductive so that a positive voltage is developed at the output lead 68 of NOR-gate 59.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles.

What is claimed is:

1. A memory flip-flop comprising: first, second, third and fourth transistors each having a base, a collector and an emitter; first, second and third reference potentials; first resistive means connecting said collectors of said first and second transistors to said first potential; second resistive means connecting said emitters of said first and second transistors to said second potential; third resistive means connecting said collectors of said third and fourth transistors to said first potential; fourth resistive means connecting said emitters of said third and fourth transistors to said second potential; first unidirectional conducting means connecting said emitters of said first and second transistors to said third potential; second unidirectional conducting means connecting said emitters of said third and fourth transistors to said third potential; first and second signal input terminals; means for connecting said first signal input terminal to said base of said second transistor, said base of said first transistor being connected to said collectors of said third and fourth transistors; means for connecting said base of said fourth transistor to said second signal input terminal, said base of said third transistor being connected to said collectors of said first and second transistors; and first and second output terminals, said first output terminal being connected to said collector of said first transistor, said second output terminal being connected to said collector of said third transistor.

2. A memory flip-flop as defined in claim 1 wherein said first and second unidirectional conducting means include: fifth and sixth transistors each having a base, a collector and an emitter, said bases of said fifth and sixth transistors being connected to said third potential, said emitter of said fifth transistor being connected to said emitters of said first and second transistors, said emitter of said sixth transistor being connected to said emitters of said third and fourth transistors; fifth resistive means connecting said collector of said fifth transistor to said first potential; and sixth resistive means connecting said collector of said sixth transistor to said first potential.

3. A memory flip-flop as defined in claim 1 wherein said first and second unidirectional conducting means include: fifth and sixth transistors each having a base, a collector and an emitter, said bases of said fifth and sixth transistors being connected to said third potential, said emitter of said fifth transistor being connected to said emitters of said first and second transistors, said emitter of said sixth transistor being connected to said emitters of said third and fourth transistors; fifth resistive means connecting said collector of said fifth transistor to said first potential; sixth resistive means connecting said collector of said sixth transistor to said first potential; third and fourth output terminals, said third output terminal being connected to said collector of said fifth transistor, said fourth output terminal being connected to said collector of said sixth transistor; seventh resistive means connecting said base of said first transistor to said third potential; and eighth resistive means connecting said base of said third transistor to said third potential.

4. A memory flip-flop as defined in claim 1 wherein said first and second unidirectional conducting means include: fifth and sixth transistors each having a base, a collector and an emitter; fifth resistive means connecting said collector of said fifth transistor to said first potential; sixth resistive means connecting said collector of said sixth transistor to said first potential; third and fourth output terminals, said third output terminal being connected to said collector of said fifth transistor, said fourth output terminal being connected to said collector of said sixth transistor, said bases of said fifth and sixth transistors being connected to said third potential, said emitter of said fifth transistor being connected to said emitters of said first and second transistors, said emitter of said sixth transistor being connected to said emitters of said third and fourth transistors; seventh resistive means connecting said base of said first transistor to said third potential; and eighth resistive means connecting said base of said third transistor to said third potential, values of said second resistive means and said first, second and third potentials being selected so that said fifth transistor is rendered conductive when said first and said second transistors are nonconducting and said fifth transistor is rendered nonconductive when any of said first and said second transistors are conducting, the value of said fourth resistive means being selected so that said sixth transistor is rendered conductive when said third and said fourth transistors are nonconducting and said sixth transistor is rendered nonconductive when any of said third and said fourth transistors are rendered conductive.

5. A memory flip-flop comprising: first, second, third, fourth, fifth and sixth transistors each having a base, a collector and an emitter; first, second and third reference potentials; first resistive means connecting said collectors of said first, second and fifth transistors to said first potential; a second resistive means connecting said emitters of said first, second and fifth transistors to said second potential; third resistive means connecting said collectors of said third, fourth and sixth transistors to said first potential; fourth resistive means connecting said emitters of said third, fourth and sixth transistors to said second potential; first unidirectional conducting means connecting said emitters of said first, second and fifth transistors to said third potential; second unidirectional conducting means connecting said emitters of said third, fourth and sixth transistors to said third potential; first, second, third and fourth signal input terminals, said first input terminal being connected to said base of said second transistor; means for connecting said third input terminal to said base of said fifth transistor, said base of said fourth transistor being connected to said second input terminal, said base of said first transistor being connected to said collectors of said third, fourth and sixth transistors; means for connecting said base of said sixth transistor to said fourth input terminal, said base of said third transistor being connected to said collectors of said first, second and fifth transistors; and first and second output terminals, said first output terminal being connected to said collector of said first transistor, said second output terminal being connected to said collector of said third transistor.

6. A memory flip-flop as defined in claim 5 wherein said first and second unidirectional conducting means include: seventh and eighth transistors each having a base, a collector and an emitter; fifth resistive means connecting said collector of said seventh transistor to said first potential; and sixth resistive means connecting said collector of said eighth transistor to said first potential, said bases of said seventh and eighth transistors being connected to said third potential, said emitter of said seventh transistor being connected to said emitters of said first, second and fifth transistors, said emitter of said eighth transistor being connected to said emitters of said third, fourth and sixth transistors, values of said second and said fourth resistive means and said first, second and third potential being selected so that said seventh transistor is rendered conductive when said first, second and fifth transistors are nonconducting and said seventh transistor is rendered nonconductive when any of said first, second and fifth transistors are conducting, said eighth transistor is rendered conductive when said third, fourth and sixth transistors are nonconducting and said eighth transistor is rendered nonconductive when any of said third, fourth and sixth transistors are rendered conductive.

7. A memory flip-flop as defined in claim 5 including: first and second NOR-gates each having first and second input leads and an output lead, said output lead of said first NOR-gate being connected to said first signal input terminal, said output lead of said second NOR-gate being connected to said second signal input terminal.

8. A memory flip-flop as defined in claim 5 including: first and second NOR-gates each having first and second input leads and an output lead, said output lead of said first NOR-gate being connected to said first signal input terminal, said output lead of said second NOR-gate being connected to said second signal input terminal; and wherein: said first and second unidirectional conducting means include seventh and eighth transistors each having a base, a collector and an emitter, said bases of said seventh and eighth transistors being connected to said third potential, said emitter of said seventh transistor being connected to said emitters of said first, second and fifth transistors, said emitter of said eighth transistor being connected to said emitters of said third, fourth and sixth transistors; fifth resistive means connecting said collector of said seventh transistor to said first potential; and sixth resistive means connecting said collector of said eighth transistor to said first potential.

9. A memory flip-flop as defined in claim 5 including: first and second NOR-gates each having first and second input leads and an output lead, said output lead of said first NOR-gate being connected to said first signal input terminal, said output lead of said second NOR-gate being connected to said second signal input terminal; and wherein said first and second unidirectional conducting means include: seventh and eighth transistors each having a base, a collector and an emitter, said bases of said seventh and eighth transistors being connected to said third potential, said emitter of said seventh transistor being connected to said emitters of said first, second and fifth transistors, said emitter of said eighth transistor being connected to said emitters of said third, fourth and sixth transistors; fifth resistive means connecting said collector of said seventh transistor to said first potential; and sixth resistive means connecting said collector of said eighth transistor to said first potential, values of said second and said fourth resistive means and said first, second and third potential being selected so that said seventh transistor is rendered conductive when said first, second and fifth transistors are nonconducting and said seventh transistor is rendered nonconductive when any of said first, second and fifth transistors are conducting, said eighth transistor is rendered conductive when said third, fourth and sixth transistors are nonconducting and said eighth transistor is rendered nonconductive when any of said third, fourth and sixth transistors are rendered conductive.

References Cited

UNITED STATES PATENTS

| | | | |
|---|---|---|---|
| 3,219,845 | 11/1965 | Nieh | 307—289 XR |
| 3,408,512 | 10/1968 | Raisanen | 307—289 XR |
| 3,430,071 | 2/1969 | Sheng | 307—215 XR |

STANLEY D. MILLER, Primary Examiner

S. T. KRAWCZEWICZ, Assistant Examiner

U.S. Cl. X.R.

307—215